United States Patent [19]
Laud et al.

[11] Patent Number: 5,949,834
[45] Date of Patent: Sep. 7, 1999

[54] VSB SYMBOL SYNC RECOVERY SYSTEM

[75] Inventors: Timothy G. Laud, Libertyville; Dennis M. Mutzabaugh, Mount Prospect, both of Ill.

[73] Assignee: Zenith Electronics Corporation, Glenview, Ill.

[21] Appl. No.: 08/791,521

[22] Filed: Jan. 30, 1997

[51] Int. Cl.$^6$ ...................................................... H04L 7/00
[52] U.S. Cl. .......................................................... 375/368
[58] Field of Search ..................................... 375/364, 365, 375/368, 366, 340, 316, 270; 348/500, 525; 370/514, 513; 329/357

[56] References Cited

U.S. PATENT DOCUMENTS

| | | | |
|---|---|---|---|
| 5,444,743 | 8/1995 | Scarpa ...................................... | 375/368 |
| 5,621,483 | 4/1997 | Krishnamurthy et al. .............. | 375/327 |
| 5,745,528 | 4/1998 | Fimoff et al. ........................... | 375/316 |
| 5,751,774 | 5/1998 | Wang ....................................... | 375/367 |

*Primary Examiner*—Tesfaldet Bocure

[57] ABSTRACT

A symbol sync acquisition circuit for a digital VSB signal finds sync pattern correlations in the incoming signal. Initially both positive and negative sync pattern correlations are accorded equal weight, with non sync pattern correlations being accorded a negative weight. Values are accumulated in a segment integrator and stored in a FIFO having a location for each symbol position in a segment. A comparator initially produces an output when sync pattern correlations are found that add to a given value. After a relatively small number of correlations, as tabulated in a confidence counter, a VCO is enabled to change its frequency under control of error pulses based upon the symbol sync. After a greater number of sync pattern correlations, the symbol position in the segment is fixed, sliding to a new symbol location in the FIFO is precluded, the signal polarity is determined and changed, if necessary, and a higher threshold is established for the comparator. The confidence counter continues to build after lock is attained. Should confidence be lost, the system resets and acquisition is started from the beginning.

11 Claims, 2 Drawing Sheets

# VSB SYMBOL SYNC RECOVERY SYSTEM

BACKGROUND OF THE INVENTION AND PRIOR ART

This invention relates to synchronizing signal recovery systems and particularly to a symbol sync recovery system for a VSB (vestigial sideband) digital signal.

The recently adopted advanced digital television signal standards are directed to a multilevel signal having two frames of 313 segments each. There are 832 multilevel symbols in each segment with the first four symbols of each segment defining a two level segment sync pattern and the first segment of each frame including a two level frame sync signal. A small pilot signal is added to aid in carrier recovery in the receiver. The receiver preferably includes a frequency and phase locked loop (FPLL) for recovering the transmitted signal. The data in the transmitted signal is subjected to precoding, interleaving and forward error correction to provide noise protection and to assist in rejection of cochannel NTSC signals.

An important requirement of the receiver is the ability to rapidly and accurately achieve symbol acquisition under field operational-conditions. As with all digital data, the signal-to-noise performance is of great importance. The nominal symbol frequency is 10.76 megasymbols per second and the receiver should ideally acquire symbol frequency lock over a range exceeding +/−70 ppm (parts per million) in under 200 milliseconds. The inventive circuit has this ability.

OBJECTS OF THE INVENTION

A principal object of the invention is to provide a method and apparatus for rapidly acquiring symbol synchronization in a VSB signal receiver.

Another object of the invention is to provide a novel arrangement for a symbol sync recovery circuit in a digital VSB signal receiver.

A further object of the invention is to provide a VSB symbol sync acquisition arrangement of improved capability.

BRIEF DESCRIPTION OF THE DRAWING

These and other objects and advantages of the invention will be apparent upon reading the following description thereof in conjunction with the drawings, in which.

DESCRIPTION OF THE PREFERRED EMBODIMENT

Figure 1:
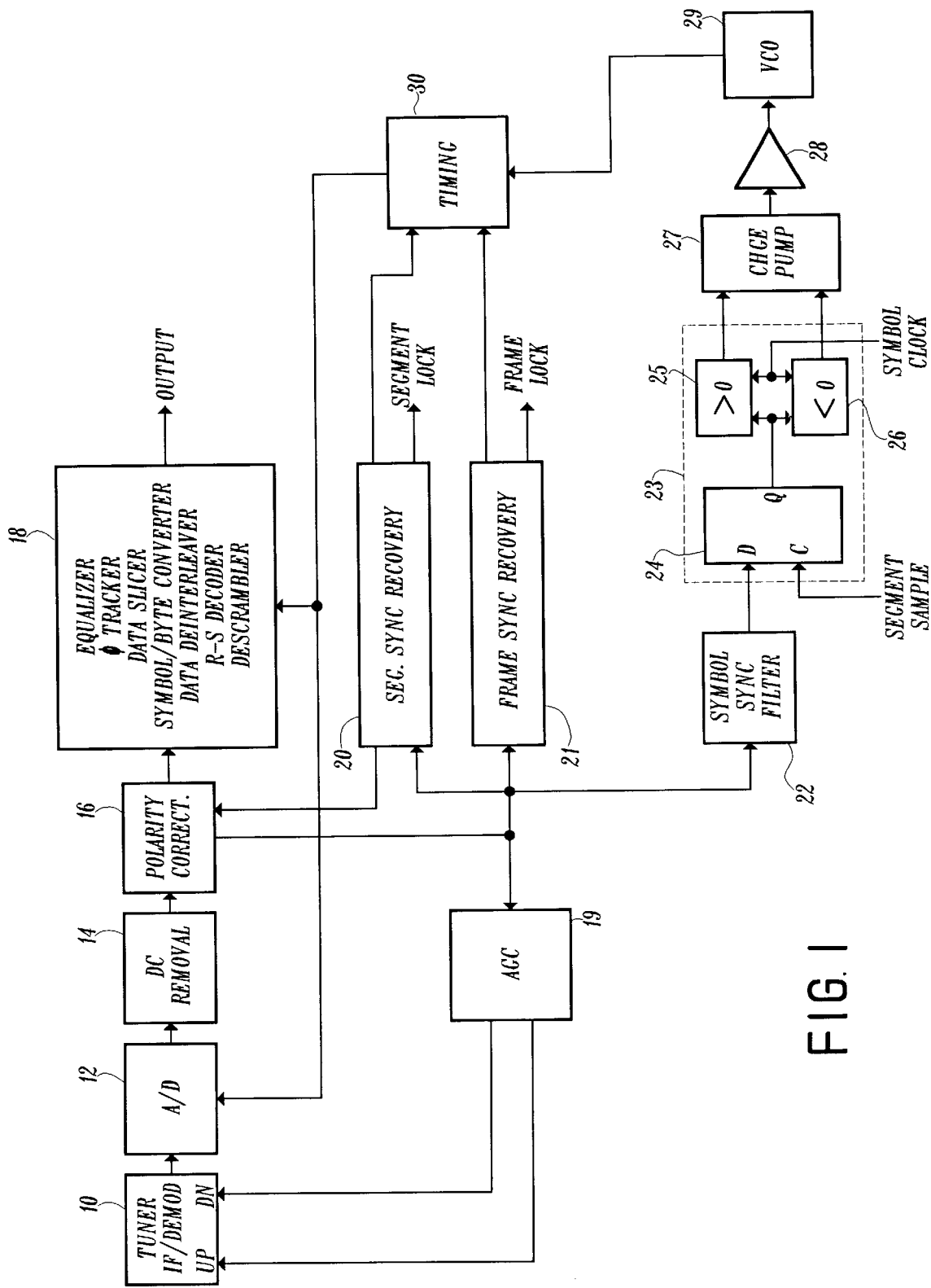
FIG. 1 is a simplified block diagram of a digital VSB signal receiver incorporating the invention.

Referring to FIG. 1, a digital VSB signal receiver includes a tuner, IF and demodulator 10 that functions to recover a transmitted VSB signal. Such arrangement preferably incorporates an FPLL (frequency and phase locked loop) for rapidly acquiring the signal using the small pilot in the transmitted signal. The demodulated signal is supplied to an analog-to-digital (A/D) converter 12 wherein the baseband signal is converted to a plurality of multilevel symbols. A/D converter 12 supplies the symbols to a DC removal circuit 14 where any DC, including the pilot, is removed. The signal is then passed to a polarity correction circuit 16 where its polarity can be reversed, if desired, since the demodulator FPLL is biphase stable and can lock up in either of two phases. The signal is applied to a signal processing block 18 that includes an equalizer, a phase tracker and data slicer, a symbol-to-byte converter, a deinterleaver, an R-S decoder and a signal descrambler. This circuitry is well known in the art and needs no further description.

The output of polarity correction circuit 16 is also supplied to a segment sync recovery circuit 20, a frame sync recovery circuit 21, a symbol sync filter 22 and an AGC circuit 19. AGC circuit 19 supplies suitable up and down control signals to the tuner, IF and demodulator 10 for controlling the level of the incoming signal in a well known manner. Symbol sync filter 22 supplies an error pulse circuit 23 that includes a flip/flop 24 supplying a pair of counters 25 and 26. The outputs of the counters 25 and 26 are coupled to a charge pump 27 that supplies a voltage controlled crystal oscillator (VCO) 29 through a low pass filter 28. The segment sync output of segment sync recovery circuit 20, the frame sync output of frame sync recovery circuit 21 and the output of VCO 29 are all supplied to a timing block 30 that develops appropriate timing signals, including those supplied to A/D 12 and signal processing block 18, and an enabling signal for error pulse circuit 23. A segment lock signal and a frame lock signal are also developed from the corresponding segment sync and frame sync recovery circuits 20 and 21.

As mentioned above, the baseband signal may have either of two polarities, depending upon the lock up phase of the demodulator FPLL (not shown). In the digital VSB system approved by the FCC, the sync pattern consists of four successive two level symbols having polarities of +−−+. The opposite polarity version of this sync pattern is therefore −++−. In the invention the data symbol stream is searched for correlations with both of these patterns until confidence is established that the sync pattern has been found, at which time the polarity of the received signal is changed, if necessary, to produce the desired symbol polarity. It will be appreciated that the symbol frequency in the received signal is approximately 10.76 megasymbols per second and that the frequency of VCO 29 must be adjusted to correspond thereto. The frequency of the VCO 29 is set to a nominal value and incremented or decremented as required to achieve a lock condition with the received symbol frequency.

Figure 2:
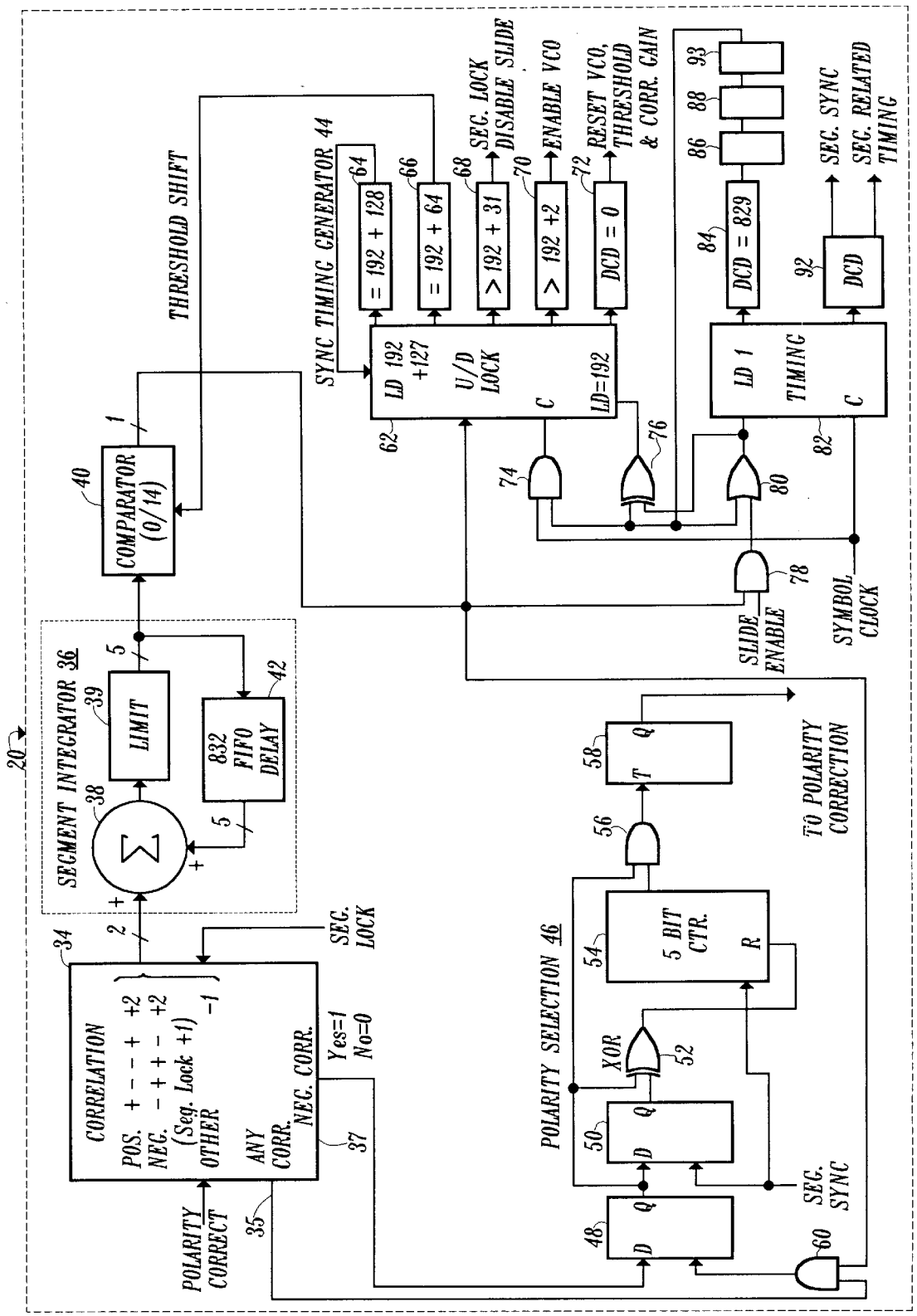
FIG. 2 is a combination schematic and block diagram of a segment sync recovery arrangement that incorporates the invention.

In FIG. 2, a correlation circuit 34 is provided in segment sync recovery circuit 20 for searching successive groups of four symbols for the positive and negative sync symbol patterns described above. Since the correlation circuit is only concerned with the polarities of the received symbols, it is apparent that many four symbol groupings may correlate with the two sync symbol patterns. As indicated, a positive or a negative sync correlation is assigned a +2 value for a segment integrator 36 that includes an adder 38, a limiter 39 and an 832×5 bit FIFO delay 42. After segment lock has been achieved, as evidenced by a segment lock signal being generated, the value assigned to a negative sync correlation is reduced from +2 to +1. (At the time of segment lock, there is a high level of confidence that sync has been located and the negative pattern correlations are afforded less weight in an effort to rapidly attain symbol lock.) Non sync pattern correlations of four symbol groups are assigned a value of −1. Segment sync integrator 36 has a range of −16 to +15 and is initially set at −16.

The output of segment integrator 36 is supplied to a comparator 40 that, in accordance with the invention, has two different threshold levels for determining its output.

Initially the threshold level for an output from comparator 40 is set at 0. This threshold level is changed to +14 when a threshold shift signal is generated, as will be discussed. The output of comparator 40 is supplied to a sync timing generator 44 and to a polarity selection circuit 46. The polarity selection circuit 46 includes a flip/flop 48 and a flip/flop 50 supplying an exclusive OR (XOR) gate 52 and an AND gate 56. XOR 52 is coupled to the reset terminal of a 5 bit counter 54, the output of which is coupled to AND 56. AND 56 supplies the T input of a flip/flop 58 that produces an output signal for polarity correction circuit 16 when the count in counter 54 reaches a preselected number, in this case 32. Flip/flop 48 is triggered by the output of an AND gate 60 that receives one input from comparator 40 and another input from an "any (sync pattern) correlation" output 35 of correlation circuit 34. A "negative (sync pattern) correlation" output 37 of correlation circuit 34 supplies the D input of flip/flop 48. The operation is such that, if 32 consecutive negative sync pattern correlation outputs are received, the polarity selection circuit 46 will generate a signal for polarity correction circuit 16 to change the polarity of the baseband signal. (It should be noted that the polarity of the signal may be changed at the demodulator output should that be preferable.)

The sync timing generator 44 includes an UP/DN counter 62, a 192+128 decode output 64, a 192+64 decode output 66, a greater than 192+31 decode output 68, a greater than 192+2 decode output 70 and a 0 decode output 72. UP/DN counter 62 functions as a confidence counter. The 192 is an arbitrary preset for the purposes of hysteresis on the reset signal. A timing counter 82 is also supplied with the output of comparator 40, via an AND gate 78 and an OR gate 80. A symbol clock signal is supplied to the clock input of timing counter 82 and to one input of an AND gate 74, the output of which is coupled to the clock input of UP/DN counter 62. The other input of AND 74 is connected in parallel with an input of an XOR gate 76 and an input of OR 80. XOR 76 loads the 192 count preset into confidence counter 62. The output of OR 80 is coupled to the other input of XOR 76. An 829 count decoder 84 and a multi count decoder 92 are coupled to timing counter 82. Decoder 84 operates when timing counter 82 achieves a count of 829 and decoder 92 operates when timing counter 82 achieves counts that correspond to segment sync and other segment related timings. Lastly, the other input of AND 78 is supplied with a normal Slide Enable signal which permits the arrangement to move among the symbol locations identified in FIFO 42. The Slide Disable signal generated by the decode output 68 precludes such shifting and is obviously only generated when a substantial degree of confidence has been achieved as to the location of the sync in the signal.

In operation, the sync pattern correlation patterns (both positive and negative) identified for each of the 832 symbol locations are reinforced by the action of segment integrator 36. When the number of net sync pattern correlations at any symbol position, corresponding to any one location in FIFO 42, reaches a count of zero (for each location the segment integrator 36 is started at −16), comparator 40 generates an output that clocks confidence counter 62, which is loaded with a preset count of 192. Successive sync pattern correlations in the same symbol location result in further outputs from comparator 40 which generates an output whenever the output of segment integrator 36 is over the threshold of zero. When confidence counter 62 has attained a count exceeding 192+2, the VCO 29 is enabled to change its frequency based upon error pulse signals received from error pulse circuit 23 that represent differences in frequency between the baseband symbol frequency and the VCO frequency. When more than 31 successive outputs of comparator 40 are received for the symbol position, the Segment Lock signal is generated along with the Slide Disable signal. The Segment Lock signal causes correlator 34 to change the value assigned to negative correlations from a +2 to a +1. The Slide Disable signal precludes the resetting of UP/DN counter 62 and a change in timing counter 82 and indicates a high degree of confidence that sync has been found.

Simultaneously, the polarity selection circuit 46 is keeping a count on the number of successive negative correlations of the sync pattern. The two inputs to AND 60 are active whenever any sync pattern correlation (negative or positive) is found by correlation circuit 34, coincident with an output from comparator 40. The negative correlation output 37 of correlation circuit 34 is high whenever a negative sync pattern correlation is found. This output is applied to the D input of flip/flop 48 and results in a Q output being applied to the D input of flip/flop 50, to an input of AND 56 and to an input of XOR 52. Counter 54 and flip/flop 50 are clocked by the segment sync signal. When counter 54 reaches the count of 32, it supplies an output to the other input of AND 56. Counter 54 will be reset by the output of XOR 52 whenever the negative correlation output 37 of correlation circuit 34 indicates a positive (not negative) correlation. Thus it takes 32 successive negative sync pattern correlations from correlation circuit 34 to indicate that the sync that has been found at that FIFO location is of negative polarity. Such finding results in a signal from the polarity correction circuit 46 to polarity circuit 16 to change the signal polarity.

As successive outputs from comparator 40 occur, indicating that the symbol position continues to reflect the presence of the sync pattern, the confidence counter 62 continues counting up. When the count reaches 192+64, the threshold shift signal is produced which results in the threshold for comparator 40 being raised to +14 from 0. Thereafter, only outputs from segment integrator 36 of +14 or more will produce an output from comparator 40. This condition indicates a very high degree of confidence that sync has been located and essentially discriminates against values corresponding to other symbol locations in the FIFO, yielding a very high immunity to noise.

The two different threshold levels are selected based upon values in confidence counter 62. This enables rapid acquisition of sync location when the VCO and symbol frequencies are far apart and high noise and error immunity when the frequencies are close. Thus the benefits of wide acquisition and good performance at low signal-to-noise levels.

As alluded to above, as the VCO is attempting to match the symbol frequency, the segment timing can be reset (allowed to slide to a new symbol location in FIFO 42) based upon the value in confidence counter 62. This provides for proper VCO correction sampling as the two frequencies continue to slide past each other prior to frequency lock.

Confidence counter 62 provides a substantial amount of hysteresis during sync acquisition to prevent loss of VCO correction during the beat notes that occur when the frequencies are very close to each other. Also the entire circuit resets when all confidence is lost to prevent lockout conditions from occurring.

Symbol sync is maintained by using an error signal derived from the four segment sync symbols as a correction factor for the VCO. Segment sync is found before symbol lock. The procedure for finding segment sync, as alluded to above, is well known. The present invention accepts either polarity of sync until polarity can be determined and altered, if necessary. With the inventive system (assigning a value of +2 to either sync pattern and a value of −1 to all other patterns), the correlator drives the segment integrator value to +15 for correlated patterns and to −16 for uncorrelated patterns. The initial threshold level of zero requires only eight correlated symbol patterns to determine initial sync position.

When the sync position is known, the polarity is sampled and a polarity correction made, if necessary. Also the VCO correction circuitry is triggered based upon segment sync and the confidence counter 62 reaching the preset +2. Thus in only ten segments the symbol clock can begin pulling in, which yields a pull in range of 120 ppm (10 segments×832 symbols =8320; 1/8320=0.000120). If the VCO is over 120 ppm off, the correction pulses will not start before the segment integrator begins correlating segment sync in the next symbol location as the two frequencies slide past each other.

The problem of the two frequencies sliding past each other is an inherent limitation on the amount of time required before attempting to lock the VCO based upon segment sync. The two thresholds of the inventive system optimize the arrangement. If the frequencies are far apart (>70 ppm) the confidence counter will not count too high before the sync pattern moves to the next location in the FIFO and causes the confidence counter to start over. Consequently a large number in the confidence counter means that the frequencies are close and that the threshold may be adjusted to optimize the signal-to-noise performance.

The segment timing generator 44 can only be reset if the value in confidence counter 62 is low. If the value is above the preset +32, extraneous outputs from comparator 40 will be rejected. If the confidence counter is low, the timing generator may be reset on the next comparator output, and if this represents a change in segment timing, the confidence counter will also be reset to the preset value of 192.

When the frequency of VCO 29 is low during a reset of segment timing circuit 82, the last few decoding states may not be generated, which can cause difficulties for operations that are dependent upon them. To insure that all decode states are available, the last few decodes are triggered by an early decode by decoder 84 followed by one symbol delay lines 86, 88 and 90, the output of which is supplied to inputs of AND 74, OR 80 and XOR 76.

The 192 preset of confidence counter 62 allows a fairly long "flywheel effect" during sync acquisition. As VCO 29 approaches the correct symbol frequency, there are long periods when there is no output from comparator 40 as sliding occurs from one location to the next in FIFO 42. During this long beat note, VCO 29 is not allowed to be reset to prevent nullification of the previous pull-in efforts. The long flywheel effect continues the proper timing pulses until the slide finds the next location in FIFO 42 and the frequency of VCO 29 will remain nearly correct during the transition. If confidence counter 62 reaches zero, it is assumed that the signal has been lost and must be reacquired from the beginning. Thus the comparator threshold is returned to zero and the correlation outputs are returned to +2 for either polarity.

What has been described is a novel method and apparatus for acquiring symbol lock in a digital VSB signal. It is recognized that numerous changes in the described embodiment of the invention will occur to those skilled in the art without departing from its true spirit and scope. The invention is to be limited only as defined in the claims.

What is claimed is:

1. A method of acquiring symbol synchronization in a digital VSB signal having a repetitive symbol sync pattern in successive data segments comprising:

analyzing symbols of the data segments for sync pattern correlations;

integrating the sync pattern correlations by location;

generating an output when the sync pattern correlations at any location attains a threshold; and increasing the threshold after a given level of sync pattern correlations at that location have been attained.

2. The method of claim 1, further comprising:

analyzing symbols of the data segments for positive and negative sync pattern correlations;

assigning equal weighting values to both the positive and the negative sync pattern correlations;

generating a segment lock signal when a certain level of sync pattern correlations has been attained; and changing the weighting values to favor the positive sync pattern correlations in response to the segment lock signal.

3. The method of claim 2, further comprising:

assigning a negative weighting value to the non sync pattern correlations; and integrating the non sync pattern correlations along with the positive and negative sync pattern correlations to develop the level of sync pattern correlations.

4. The method of claim 3, further comprising:

counting the negative sync pattern correlations after the threshold has been attained;

developing a control signal upon counting a predetermined number of successive negative sync pattern correlations; and changing the polarity of the digital VSB signal in response to the control signal.

5. The method of claim 4, further comprising:

accumulating the number of sync pattern correlations; and precluding a shift from one sync pattern correlation location to another sync pattern correlation location as long as the level of the positive sync pattern correlations exceeds a selected number.

6. A method of acquiring symbol synchronization in a digital VSB signal having a group of symbols defining a sync pattern in corresponding locations in successive data segments, comprising:

analyzing successive groups of symbols in search of positive and negative sync pattern correlations;

assigning positive values to both the positive and the negative sync pattern correlations;

assigning a negative value to non sync pattern correlations;

integrating all of the correlation values by location;

generating an output signal when the total value of sync pattern correlations at any location attains a first threshold; and increasing to a second threshold whenever a given value of sync pattern correlations in excess of the first threshold has been attained.

7. A receiver for receiving a digital VSB signal having a repetitive symbol sync pattern in successive data segments comprising:

means for analyzing successive groups of said symbols of said data segments for sync pattern correlations;

a FIFO;

means for integrating said sync pattern correlation by symbol location and storing the result in said FIFO;

means for generating an output when said sync pattern correlations at any symbol location attains a given threshold; and means for increasing said threshold after a given level of sync pattern correlations has been attained.

8. The receiver of claim 7, further comprising:

means for analyzing successive groups of said symbols for positive and negative sync pattern correlations;

means for assigning equal weighting values to both said positive and said negative sync pattern correlations;

means for generating a segment lock signal when a certain level of said sync pattern correlations has been attained; and means for changing said weighting values to favor said positive sync pattern correlations in response to said segment lock signal.

9. The receiver of claim 8, further comprising:

means for assigning a negative weighting value to non sync pattern correlations;

means for integrating said non sync pattern correlations along with said positive and said negative sync pattern correlations; and means for changing the polarity of said signal in response to said control signal.

10. The receiver of claim 9, further including:

means for accumulating the number of said positive sync pattern correlations; and means for precluding a shift between symbol locations in said FIFO as long as the level of said positive sync pattern correlations exceeds a selected number.

11. A receiver for receiving a digital VSB signal having a repetitive symbol sync pattern in successive data segments comprising:

means for analyzing successive groups of said symbols of said data segments for positive and negative sync pattern correlations and for non sync pattern correlations;

a FIFO having a plurality of locations;

means for assigning equal positive values to said positive and said negative sync correlations and a negative value to said non sync pattern correlations;

means for integrating all of said sync pattern correlations and non sync pattern correlations and storing the values thereof in corresponding ones of said plurality of locations in said FIFO;

means for generating an output signal when any of said value at said FIFO locations attains a threshold;

means for counting said negative sync pattern correlations after said threshold has been attained;

means for developing a control signal upon counting a predetermined number of successive ones of said negative sync pattern correlations;

means for changing the polarity of said symbols in response to said control signal;

means for generating a lock signal when a certain level of said sync pattern correlations has been attained;

means for changing said assigned values to favor said positive sync pattern correlations in response to said lock signal;

means for increasing said threshold after a given level of said sync pattern correlations has been attained;

means for accumulating the number of said positive sync pattern correlations; and means for precluding a shift between symbol locations in said FIFO as long as the level of said positive sync pattern correlations equals a selected number.

* * * * *